US009167189B2

(12) United States Patent
Shahraray et al.

(10) Patent No.: US 9,167,189 B2
(45) Date of Patent: Oct. 20, 2015

(54) AUTOMATED CONTENT DETECTION, ANALYSIS, VISUAL SYNTHESIS AND REPURPOSING

(75) Inventors: Behzad Shahraray, Holmdel, NJ (US); Andrea Basso, Marlboro, NJ (US); Lee Begeja, Gillette, NJ (US); David C. Gibbon, Lincroft, NJ (US); Zhu Liu, Marlboro, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 764 days.

(21) Appl. No.: 12/579,993

(22) Filed: Oct. 15, 2009

(65) Prior Publication Data

US 2011/0093798 A1   Apr. 21, 2011

(51) Int. Cl.
| | |
|---|---|
| *G06F 3/00* | (2006.01) |
| *H04N 5/445* | (2011.01) |
| *G11B 27/034* | (2006.01) |
| *G11B 27/28* | (2006.01) |
| *H04N 21/431* | (2011.01) |
| *H04N 21/44* | (2011.01) |
| *H04N 21/8549* | (2011.01) |
| *H04N 21/482* | (2011.01) |

(52) U.S. Cl.
CPC .......... *H04N 5/44543* (2013.01); *G11B 27/034* (2013.01); *G11B 27/28* (2013.01); *H04N 21/4312* (2013.01); *H04N 21/44008* (2013.01); *H04N 21/482* (2013.01); *H04N 21/8549* (2013.01)

(58) Field of Classification Search
USPC .......................................................... 715/723
See application file for complete search history.

(56) References Cited

U.S. PATENT DOCUMENTS

| | | | |
|---|---|---|---|
| 6,219,837 B1 | 4/2001 | Yeo et al. | |
| 6,572,662 B2 * | 6/2003 | Manohar et al. | 715/273 |
| 6,990,681 B2 | 1/2006 | Wang et al. | |
| 2003/0014758 A1 | 1/2003 | Kim | |
| 2007/0245242 A1 | 10/2007 | Yagnik | |
| 2009/0207316 A1 | 8/2009 | Cupal et al. | |
| 2010/0070523 A1 * | 3/2010 | Delgo et al. | 707/769 |

* cited by examiner

*Primary Examiner* — Andrey Belousov
(74) *Attorney, Agent, or Firm* — Chiesa Shahinian & Giantomasi PC

(57) ABSTRACT

A content summary is generated by determining a relevance of each of a plurality of scenes, removing at least one of the plurality of scenes based on the determined relevance, and creating a scene summary based on the plurality of scenes. The scene summary is output to a graphical user interface, which may be a three-dimensional interface. The plurality of scenes is automatically detected in a source video and a scene summary is created with user input to modify the scene summary. A synthetic frame representation is formed by determining a sentiment of at least one frame object in a plurality of frame objects and creating a synthetic representation of the at least one frame object based at least in part on the determined sentiment. The relevance of the frame object may be determined and the synthetic representation is then created based on the determined relevance and the determined sentiment.

9 Claims, 4 Drawing Sheets

AUTOMATED CONTENT DETECTION, ANALYSIS, VISUAL SYNTHESIS AND REPURPOSING

BACKGROUND

The present disclosure relates generally to synthetic content creation and more particularly to automated detection analysis, visual synthesis and repurposing of content.

Television services, such as digital cable, satellite television, and internet protocol television (IPTV) provide many viewing options for users. In order for a user to decide what content to watch, such as television programming, movies, etc., a programming guide is typically provided on the screen of a user's television. Conventional programming guides typically provide a listing of content available for a user to view, as well as a very simple summary of the available content. For example, conventional programming guides typically provide a brief description of the plot of a particular program and possibly a picture corresponding to the program. However, such a simple summary may not be enough to allow a user to form an accurate opinion regarding the available content.

BRIEF SUMMARY

The present disclosure generally provides methods for automated content detection, analysis, visual synthesis, and repurposing. As described above, conventional programming guides provide a simple summary of content available for user viewing. Embodiments of the present disclosure provide enhanced content summaries automatically generated using the actual content. Such enhanced summaries can allow a user to quickly and accurately judge whether to access available content, such as television programs, movies, music, etc.

In a first embodiment, a content summary is created by automatically determining a relevance of each of a plurality of scenes, extracting at least one of the plurality of scenes based on the determined relevance, and creating a scene summary based on the plurality of scenes. The scene summary is output to a graphical user interface, which may be a three-dimensional interface.

In a second embodiment, a synthetic frame representation is formed by determining a sentiment of at least one frame object in a plurality of frame objects and creating a synthetic representation of the at least one frame object based at least in part on the determined sentiment. The relevance of the frame object may be determined and the synthetic representation is then created based on the determined relevance and the determined sentiment.

These and other advantages of the invention will be apparent to those of ordinary skill in the art by reference to the following detailed description and the accompanying drawings.

DETAILED DESCRIPTION

Electronic program guides (EPGs), media navigation systems, personal computers, and the like allow increasing amounts of user control over media (e.g., audio, video, images, text, etc.) that is made available to the users. Described below are systems and methods that allow multi-touch navigation of such systems and their underlying content. The underlying content may be organized in a hierarchical structure, such as is used in clustering. Additionally, this content may be summarized automatically either pre- or post-production.

In at least one embodiment, the content is organized in a profile-based matrix layout. In the same or alternative embodiments, the layouts may be organized and/or navigated in three dimensions. In one such layout, time is used as the x-axis. These layouts may be personalized, color-coded, or otherwise thematically organized. They may be spatially mapped for use by multiple users and may generate a listing of content that can be followed by other users. That is, the personalized layouts may, when actuated by a user, create a "trail" or playlist of content that has been accessed, marked, or otherwise indicated as relevant by a particular user. In this way, the personalized layouts may be cross-personalized such that users may interact with the content of other users in a live or delayed access system.

Figure 1:
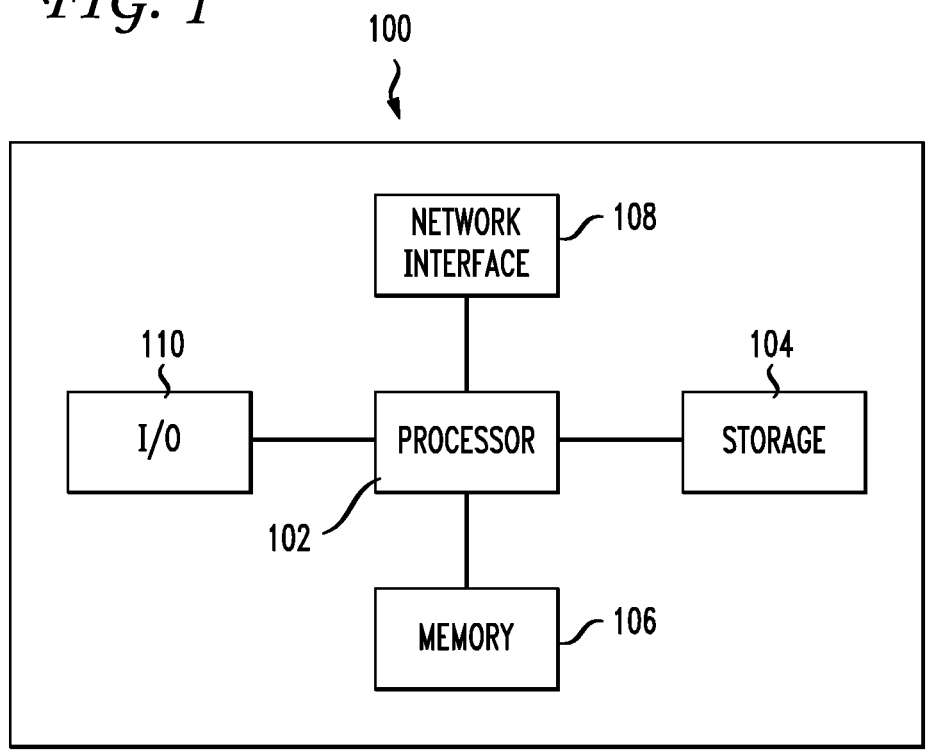
FIG. 1 is a diagram of a controller.

FIG. 1 is a schematic drawing of a controller 100 according to an embodiment of the present invention. Controller 100 may be used to control interfaces 200 and 300 of FIGS. 2 and 3 below and/or may be used to implement the methods described below with respect to FIGS. 4 and 5.

Controller 100 contains devices that form a controller including a processor 102 that controls the overall operation of the controller 100 by executing computer program instructions, which define such an operation. The computer program instructions may be stored in a storage device 104 (e.g., magnetic disk, database, etc.) and loaded into memory 106 when execution of the computer program instructions is desired. Thus, applications for performing the herein-described method steps, such as those described below with respect to methods 400 and 500 are defined by the computer program instructions stored in the memory 106 and/or storage 104 and controlled by the processor 102 executing the computer program instructions. The controller 100 may also include one or more network interfaces 108 for communicating with other devices via a network. The controller 100 also includes input/output devices 110 that enable operator interaction with the controller 100. Controller 100 and/or processor 102 may include one or more central processing units, read only memory (ROM) devices and/or random access memory (RAM) devices. One skilled in the art will recognize that an implementation of an actual computer for use in a portable communication device could contain other components as well, and that the controller of FIG. 1 is a high level representation of some of the components of such a portable communication device for illustrative purposes.

According to some embodiments of the present invention, instructions of a program (e.g., controller software) may be read into memory 106, such as from a ROM device to a RAM device or from a LAN adapter to a RAM device. Execution of sequences of the instructions in the program may cause the controller 100 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 106 may store the software for the controller 100, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

Figure 2:
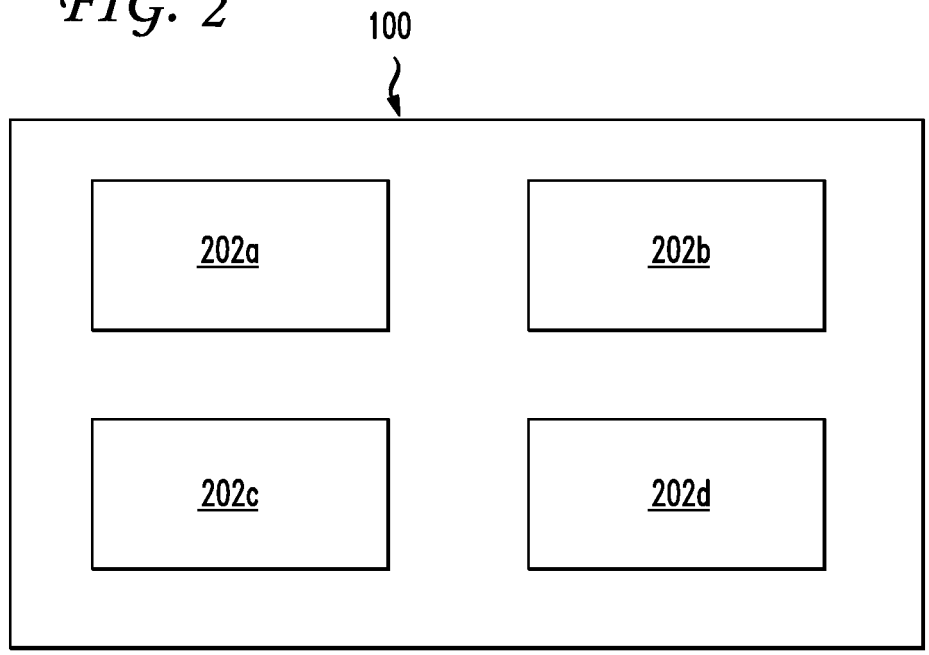
FIG. 2 is a diagram of a personalized layout according to an embodiment of the present invention.

FIG. 2 is a diagram of a personalized layout 200 according to an embodiment of the present invention. Layout 200 is a graphical user interface or other like interface that allows a user to manipulate data and/or metadata relating to underlying content. As discussed below, layout 200 may be personalized by a user. The exemplary embodiment of layout 200 is a two dimensional interface. Layout 200 includes a plurality of icons 202a-d. The icons are indicative of underlying content or underlying content clusters and may be displayed as thumbnails, graphical representations, text, or the like. Similarly, they may be color coded or otherwise thematically organized to visually display the type of information represented (e.g., audio, sports, news, video, etc.). Content, synthetic content, and/or representations of content are presented to layout 200 according to the methods described below with respect to FIGS. 4 and 5.

Figure 3:
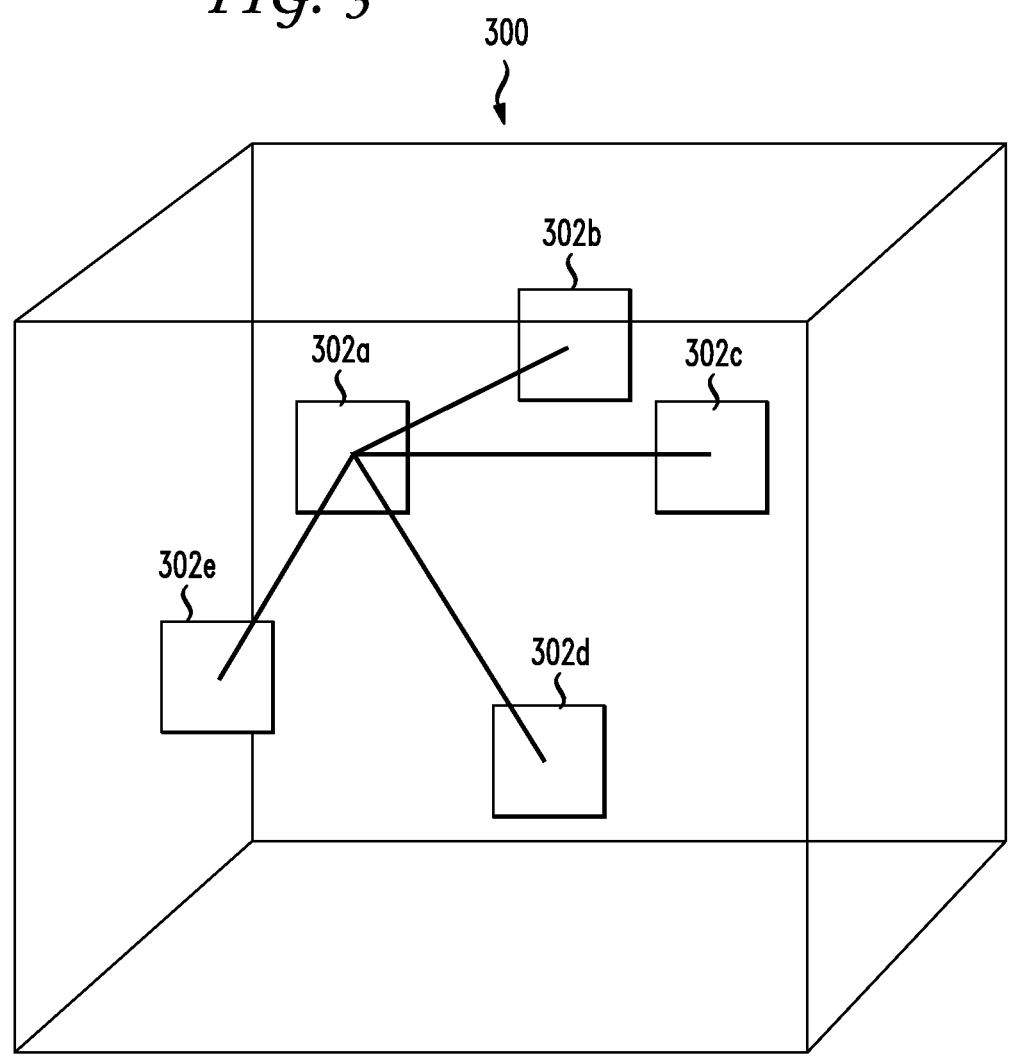
FIG. 3 is a diagram of a personalized layout according to an embodiment of the present invention.

FIG. 3 is a diagram of a personalized layout 300 according to an embodiment of the present invention. Layout 300 is a graphical user interface or other like interface that allows a user to manipulate data and/or metadata relating to underlying content. As discussed below, layout 300 may be personalized by a user. The exemplary embodiment of layout 300 is a three dimensional interface. Layout 300 includes a plurality of icons 302a-e. Icons 302a-e are interrelated by one or more common themes, authors, contents, or the like.

A user may navigate through the icons 302a-e along a time axis (e.g., the x-axis) from icon 302a to 302c. For example, icon 302a may be a representation of a newscast related to an upcoming presidential speech while icon 302c may be a representation of the actual speech, which occurs after the newscast. Additionally, a user may navigate deeper into underlying content from icon 302a to icon 302b. For example, icon 302a may represent a clip (e.g., a portion) of a television program while icon 302b represents the entire television program.

A user can navigate the interfaces of FIGS. 2 and 3 using a variety of navigation methods, such as a remote control, multi-touch navigation, voice control, tactile controls, etc. Such controls allow a user to navigate the interfaces to select available content based on summaries or other enhanced content generated and displayed in the interfaces. Such as display may be hierarchical and a user can select the hierarchy to view. For example, in the icons 202a-d of FIG. 2, users can display summaries or other enhanced content corresponding to content on different channels of television programming or content in different scenes of a particular television program or movie.

Figure 4:
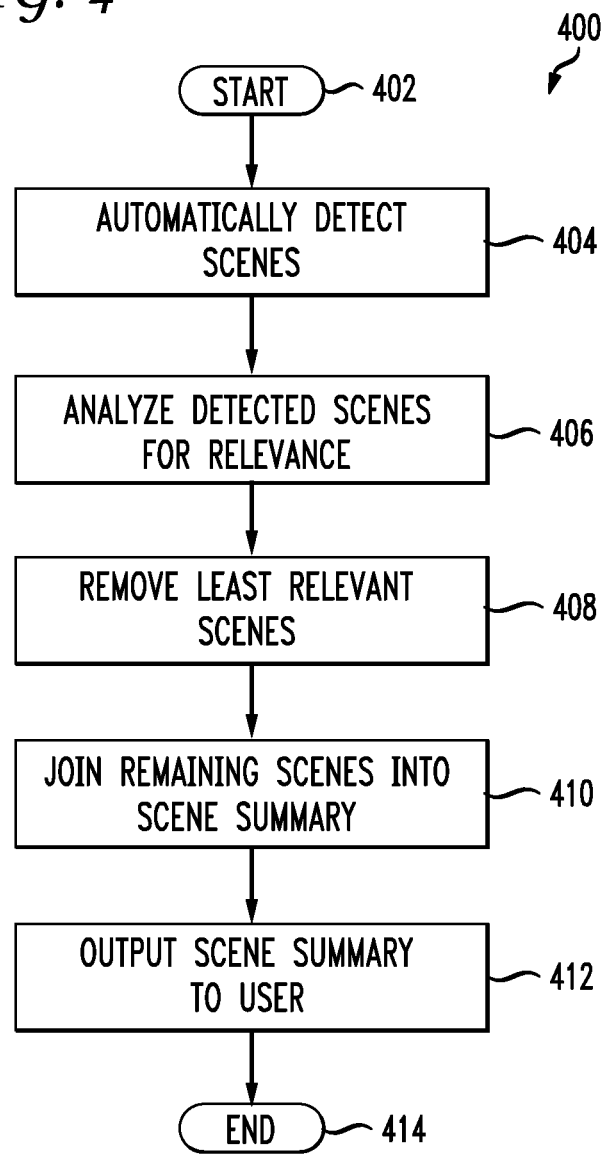
FIG. 4 is a flowchart of a method of synthetic content creation according to an embodiment of the present invention.

FIG. 4 is a flowchart of a method 400 of automatically generating an enhanced summary of content according to an embodiment of the present invention. The method 400 may be performed by the controller 100 of FIG. 1 or an analogous device. For example, a centralized server may be used to perform the method 400 of FIG. 4. The method 400 begins at step 402.

In step 404, pluralities of scenes are automatically detected in the content. For example, a television program or a movie can be automatically divided into a plurality of scenes. Known methods of pattern matching or metadata searching may be used.

In step 406, the detected scenes are analyzed for relevance. A scene may be considered relevant (e.g., important) based on a number of predetermined factors such as clustering, difference from and/or similarity to other scenes, motion within the scene, face recognition within the scene, etc. Accordingly, at least one feature is detected in each scene and the scenes are ranked according to the detected at least one feature. Clustering will group scenes that have similar features. According to an embodiment of the present disclosure, a user may specify which feature(s) is most important. According to another embodiment, user feedback can be automatically generated in order to track programs selected for viewing by a user. The features most commonly selected by a user (i.e., programs with lots of motion) can be given greater weight in the determination of relevance for the detected scenes. After the scene is analyzed for relevance in step 406, one or more of the least relevant scenes are removed from the plurality of scenes in step 408.

In step 410, the remaining scenes (e.g., the most relevant scenes) are concatenated or otherwise joined into a combined scene. Each scene may be a "clip" or "thumbnail" of the overall content. The combined scene includes all of the most relevant scenes and may be organized in any appropriate manner. For example, the scenes may be ordered according to importance within the combined scene such that the most important scene is shown first, followed by the next most important scene, etc. Of course, other arrangements may be used as necessary or desired. The most relevant scenes may be combined in a sequence (to be displayed in a single window or icon of an interface) or in parallel (to be displayed in multiple windows or icons of an interface). In at least one embodiment, a user may control the scene concatenation. For example, the user may interact with an interface, such as layouts 200 and 300 of FIGS. 2 and 3 above, to control the combination speed, importance levels, scenes included, or other information about the combined scene.

In step 412, the combined scene (e.g., a scene summary) is output to the user. In at least one embodiment, the scene is output to a layout such as layout 300 of FIG. 3 above and is connected to the individual scenes that make up the scene summary, the background and/or underlying content used in the creation of the scene summary, and/or related data, metadata, or content that is determined by the controller 100. According to one embodiment, the combined scene can be output to be displayed sequentially in a window or icons of the interface. In this case, the multiple summaries of different content can be displayed simultaneously to a user in a single interface. According to another embodiment, the combined scene can be displayed in parallel using multiple windows or icons of the interface. The method 400 ends at step 414.

Figure 5:
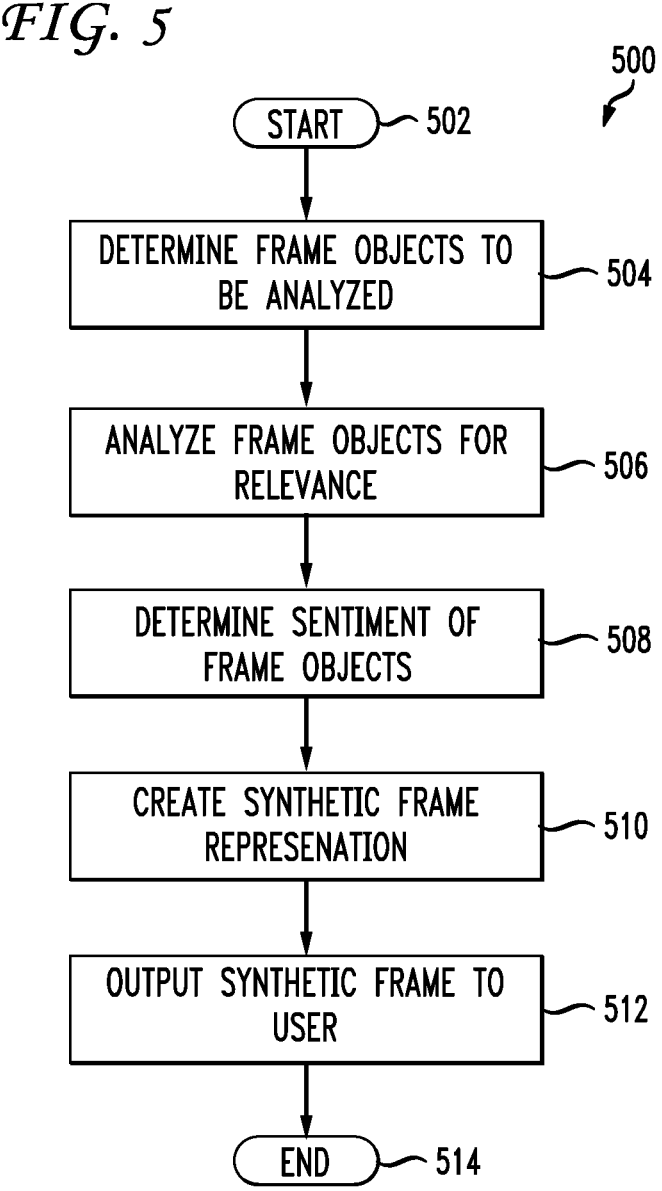
FIG. 5 is a flowchart of a method of synthetic frame generation according to an embodiment of the present invention.

FIG. 5 is a flowchart of a method 500 of synthetic frame representation and creation according to an embodiment of the present invention. The method 500 may be performed by the controller 100 of FIG. 1 or an analogous device. For example, a centralized server, may be used to perform the method 500 of FIG. 5. The method 500 begins at step 502.

In step 504, frame objects to be analyzed are determined. Frame objects are any objects, items, people, or the like contained within a single scene, frame, or clip. For example, in a video clip, a particular frame may have a known news anchor and that person may be detected as a "frame object."

In step 506, the determined frame objects are analyzed for relevancy. Relevancy may be determined based on pattern matching metadata of the source material (e.g., a video to which the frame belongs), etc. Relevancy may be based on a threshold, an exact matching, a pattern match, or any other appropriate determination method.

In step 508, sentiment is determined. In some embodiments, determining sentiment is part of determining the relevancy of a frame object. That is, a frame object may be analyzed for sentiment to determine if a relevant sentiment is displayed in a combined step 506/508. In alternative embodiments, sentiment is determined for only the relevant frames and/or frame objects.

Sentiment determination may find an emotion and/or emotional display of a frame object (e.g., a person in a video clip, a singer in an audio clip, etc.). Such emotions may include anger, crying, laughing, stress, etc. Sentiment determination may be based on tone, volume, volume changes, voice warbling, facial movement, body posture, and the like. Sentiment determination can be implemented based on stored visual and audio indicators that indicate various emotions. The relevant frame objects are automatically examined to detect visual and audio indicators in each frame object and match the detected indicators with the stored indicators in order to determine an overall sentiment for a frame. Although the sentiment is described herein as an emotion, the present disclosure is not limited thereto. For example, other themes such as sports, news, music, or adult programming may be detected for a particular frame as well.

In step 510, a synthetic frame representation is created. Based on the sentiment determined in step 508 and/or the relevancy determined in step 506, one or more frames and/or frame objects are represented with a synthetic frame.

The synthetic frame may be based on a predetermined model or may be generated individually. Based on the determined sentiment in a particular frame, a predetermined synthetic frame may be retrieved from a database. For example, if anger is detected in a particular frame, a red star-shaped synthetic frame may be retrieved. Additionally and/or alternatively, a new synthetic frame graphic may be generated based on the detected sentiment or emotion. After the synthetic frame is retrieved or created, it may be modified with emotionally driven editing. For example, a cartoon representation of the frame can be generated to show the sentiment detected on the frame. It is also possible that a predetermined synthetic frame is selected to represent a certain theme or sentiment.

In step 512, the synthetic frame is output to a user. In at least one embodiment, the synthetic frame is output to a layout such as layout 300 of FIG. 3 above. In this way, the user is provided with a graphical indication of the underlying content. In at least one embodiment, this graphical indication may be color coded according to theme and/or sentiment. The synthetic frame can be displayed to the user to provide an indicator of the content represented by the synthetic frame. For example, the synthetic frame can be displayed in an icon of the interfaces of FIGS. 2 and 3. The method 500 ends at step 514.

The method of FIG. 5 illustrates synthetic frame creation according to an embodiment of the present invention. In addition to displaying synthetic frames as graphical representations of underlying content, a set of synthetic frames can be stored and indexed and made available for browsing, searching and retrieval. The index can relate synthetic frames to their specific videos and be based on the particular sentiments that they express. Thus, the frames can be searchable based on the sentiments that they represent. For example, a user can enter a request for videos with laughter expressed by the main characters and get a set of hits that can be either the specific scenes or alternatively, the set of videos that meet the criteria. It is also possible that the sentiment criteria can be combined with other criteria to retrieve a set of scenes or videos. For example, a user could specify "movies in which John Wayne laughs". This type of search would combine many metadata elements including the synthetic frame sentiment.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of automatically generating a summary of content, the method comprising:
   determining, by a processor, a relevance of each of a plurality of scenes of the content based on a feature detected in each of the plurality of scenes, wherein the feature is selected by the processor from a plurality of features based on tracked programs selected for viewing by a particular user;
   extracting a plurality of most relevant scenes from the plurality of scenes based on the relevance determined for each of the plurality of scenes;
   generating the summary of content by combining the plurality of most relevant scenes;
   receiving an indication from a user to modify importance levels assigned to individual ones of the plurality of most relevant scenes included within the summary of content to control an order in which the plurality of most relevant scenes are organized within the summary of content; and
   receiving an indication from a user to modify combination speed of the summary of content.

2. The method of claim 1, further comprising:
   outputting the summary of content to a graphical user interface.

3. The method of claim 2, wherein the graphical user interface is a three-dimensional interface.

4. The method of claim 1, further comprising:
   detecting, by the processor, the plurality of scenes in a source video.

5. The method of claim 1, further comprising:
   receiving an indication from a user to modify a selection of which ones of the plurality of most relevant scenes are included in the summary of content.

6. A tangible computer readable medium storing computer program instructions for automatically generating a summary of content which, when executed on a processor, cause the processor to perform operations comprising:

determining a relevance of each of a plurality of scenes of the content based on a feature detected in each of the plurality of scenes, wherein the feature is selected by the processor from a plurality of features based on tracked programs selected for viewing by a particular user;

extracting a plurality of most relevant scenes from the plurality of scenes based on the relevance determined for each of the plurality of scenes;

generating the summary of content by combining the plurality of most relevant scenes;

receiving an indication from a user to modify importance levels assigned to individual ones of the plurality of most relevant scenes included within the summary of content to control an order in which the plurality of most relevant scenes are organized within the summary of content; and receiving an indication from a user to modify a combination speed of the summary of content.

7. The tangible computer readable medium of claim 6, wherein the operations further comprise:

detecting the plurality of scenes in a source video.

8. The tangible computer readable medium of claim 6, wherein the operations further comprise:

outputting the summary of content to a graphical user interface.

9. The tangible computer readable medium of claim 8, wherein the operations further comprise:

receiving an indication from a user to modify a selection of which ones of the plurality of most relevant scenes are included in the summary of content.

\* \* \* \* \*

UNITED STATES PATENT AND TRADEMARK OFFICE
CERTIFICATE OF CORRECTION

PATENT NO. : 9,167,189 B2  
APPLICATION NO. : 12/579993  
DATED : October 20, 2015  
INVENTOR(S) : Behzad Shahraray et al.

Page 1 of 1

It is certified that error appears in the above-identified patent and that said Letters Patent is hereby corrected as shown below:

In the claims

Claim 9, Column 7, Line 25, "The tangible computer readable medium of claim 8"

should read -- The tangible computer readable medium of claim 6 --

Signed and Sealed this
Twenty-third Day of February, 2016

Michelle K. Lee
*Director of the United States Patent and Trademark Office*